Jan. 18, 1938.  E. H. REMDE  2,106,063
INDUSTRIAL TRUCK
Filed Aug. 16, 1935  2 Sheets-Sheet 1
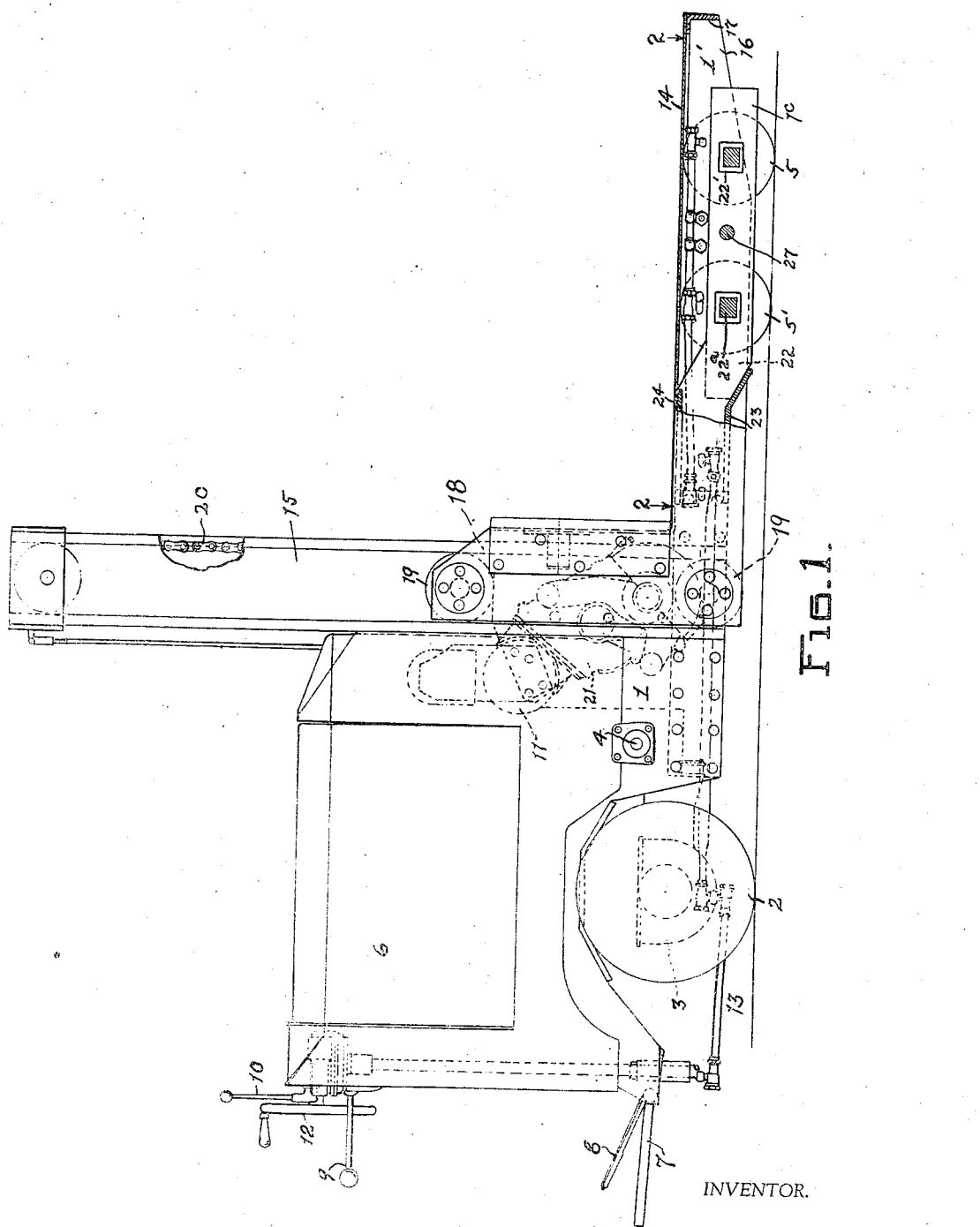
INVENTOR.
BY Edward H. Remde
Geo. B Pitts
ATTORNEY.

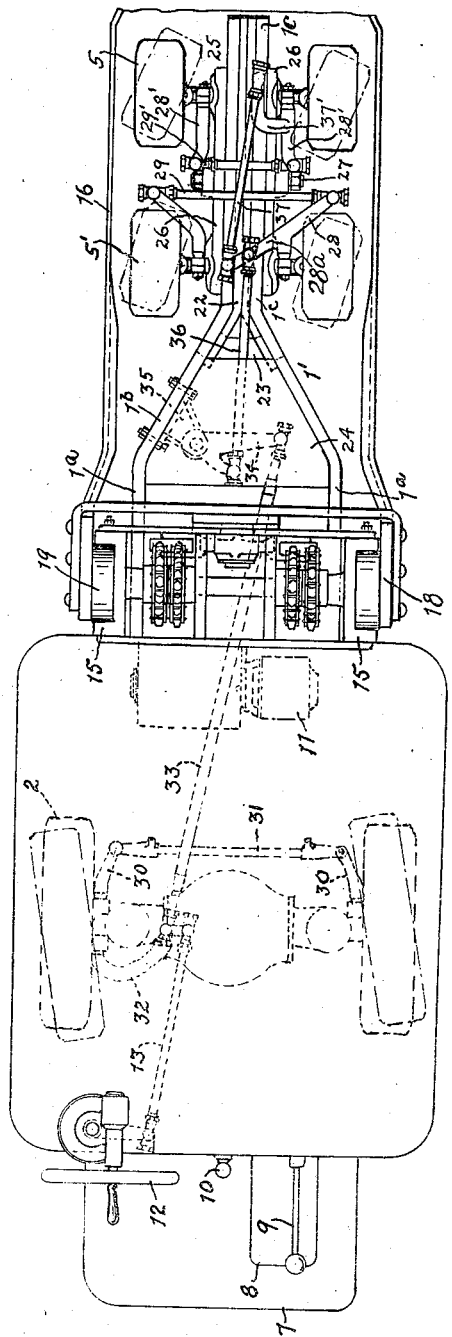

Patented Jan. 18, 1938

2,106,063

UNITED STATES PATENT OFFICE 2,106,063

INDUSTRIAL TRUCK

Edward H. Remde, Cleveland, Ohio, assignor to The Baker-Raulang Company, Cleveland, Ohio, a corporation of Ohio Application August 16, 1935, Serial No. 36,522

6 Claims. (Cl. 280—95)

This invention relates to an industrial truck, more particularly a truck of the type wherein there is provided below one end of the truck frame or chassis a trunnioned sub-frame carrying outer and inner pairs of steerable wheels. Such construction of truck has been found advantageous for use in transporting loads weighing three tons and upwards. In actual use and as shown in the accompanying drawings, the invention has been applied to a truck construction of this type in which that portion of the truck frame over and adjacent the sub-frame is arranged relatively close to the ground or floor this arrangement permitting the use of a low load carrying platform or an elevating member which may be lowered sufficiently for carrying out various loading and unloading operations. In such truck constructions, of which I have knowledge, it has been necessary to cut away or reduce the cross sectional area of the frame between the pair of wheels at the other end of the frame and the set of wheels already referred to to accommodate the stering connections for the latter wheels. As the greater portion of the weight of the load, in trucks of this construction, is carried by the pairs of wheels and the steering connections for these wheels must be associated therewith, such cut away of the frame materially reduces its rigidity and strength. This weakening of the frame is especially disadvantageous where the frame supports on its said central portion between the pair of wheels and set of wheels upright guide members, as shown in the drawings, as the weight of the entire load is carried by these members.

One object of the invention is to provide an improved truck construction in which the connections for the pairs of steering wheels carried by the sub-frame are so arranged that these disadvantages are overcome.

Another object of the invention is to provide, in a truck having at one end of its frame or chassis a trunnioned sub-frame carrying pairs of steerable wheels, an improved arrangement of steering connections for the latter, so that none of the elements extend outwardly beyond the outer wheels in position to be jammed or inwardly beyond the inner wheels to require a special frame construction.

Another object of the invention is to provide, in a truck having a low load carrying frame at one end supported by pairs of steerable wheels, mounted on a rocking or trunnioned sub-frame, an improved steering arrangement the elements of which are connected with the wheel spindles, are free to move with the sub-frame and independently of the truck frame and the sub-frame whereby the steering connections are simplified and easy operation insured.

Other objects of the invention will be apparent to those skilled in the art to which my invention relates from the following description taken in connection with the accompanying drawings, wherein—

Fig. 1 is a view of a truck embodying my invention, partly in section and partly in elevation.

Fig. 2 is a plan view, parts being omitted.

In the drawings, 1 indicates as an entirety a frame shaped at one end to accommodate relatively large driving wheels 2 (shown diagrammatically) driven by means of a suitable axle mechanism. This mechanism is mounted within a housing 3 having a tail portion supported by a yoke which is pivoted at its opposite ends at 4 on the frame 1. The tail portion supports a suitable electric motor (not shown) which is drivingly connected in any well known manner to the axle mechanism. The driving mechanism, its motor and their supporting means are preferably similar to like parts shown in Letters Patent No. 1,628,145 issued to me and John H. Hertner and reference may be made thereto for a full disclosure of these parts. The opposite end of the frame 1 constitutes the load carrying portion 1', supported by outer and inner pairs of wheels 5, 5', (shown diagrammatically) as later set forth. The current for the driving motor is preferably supplied by suitable batteries 6. At the driving end of the frame 1 I provide a platform 7 for the driver, a brake pedal 8 for braking connections connected to suitable brake shoes normally applied to some driven element as is customary in trucks of this character, a lever 9 for controlling the current to the driving motor, a lever 10 for controlling the current to an electric motor 11 (to which reference will later be made) and a device 12 operating through steering connections, indicated as an entirety at 13, for steering simultaneously the wheels 2, 5, 5', as indicated by the dotted lines in Fig. 2. 14 indicates a platform which surmounts the load carrying portion 1' of the truck frame. For illustrative purposes, the platform is mounted to move vertically, to permit of various load handling operations. The disclosed form of platform mounting consists of a pair of vertically disposed guide members 15, rigidly secured at their lower ends to portions of the truck frame 1 in any well known manner, at a point substantially midway of the wheels 2 and pairs of wheels 5, 5'. The platform 14 is secured to a pair of sills 16 connected at their outer ends by a cross bar 17 and the sills 16 are provided at their inner ends with upright portions 18 which carry upper and lower rollers 19, these parts constituting an elevating member. The rollers 19 engage track-ways on the guides 15 to slidably support the elevating member thereon. The elevating member is raised and lowered by suitable flexible members 20, such as sprocket chains, running over sprockets and operated by a power mechanism 21, driven by the motor 11. The exemplified form of elevating members, its mounting and the power means therefor forms no part of the present invention.

The truck frame or chassis 1 includes a pair of sills 1a which have converging sections 1b and extended parallel sections 1c. The sections 1b, 1c, are reinforced by intermediate members 22. Those portions of the sections 1b contiguous to the sections 1c are bent downwardly to dispose the latter sections in a plane somewhat lower than the plane of the sills 1a, to provide room or space between the platform 14 when in its lowermost position and the load carrying portion 1' adjacent the wheels 5, 5'. In this arrangement those portions of the sills inwardly of the downwardly bent portions serve as a stop to limit the platform in its downward movement, as well as a support therefor when lowered into engagement with such portions. 23 indicates a brace connected to the lower edges of the sections 1b. 24 indicates a brace plate connected to the upper edges of the sections 1b. As will be understood from Fig. 2, the frame parts just described constitute the load carrying portion 1' of the frame 1.

25 indicates as an entirety a sub-frame trunnioned on the load carrying portion 1' of the frame. The sub-frame 25 comprises generally plates 26 relatively movable on a shaft 27 which is mounted in and extends through the frame sill sections 1c and reinforcing members 22. The plates carry at their opposite outer ends the end portions of axles 22a, on the ends of each of which are knuckle mounted one pair of wheels 5 or 5'. The sill sections 1c and reinforcing members 22 are formed with openings 22' to accommodate and permit movement of the axles.

The construction of the sub-frame 25 and mounting of the axles thereon and construction of the wheels 5, 5', and knuckles therefor are fully disclosed in my Patent No. 1,853,780 dated April 12, 1932, to which reference may be made, for which reason further illustration and description of these parts are not necessary to an understanding of the present invention.

The steering connections for the wheels 5, 5', comprise the following elements: the spindle for each inner wheel 5' is provided with an arm 28 extending toward the outer wheel 5, and upwardly and laterally, their outer or free ends being connected by a rod 29; likewise the spindle for each outer wheel 5 is provided with an arm 28' extending toward the inner wheels and upwardly, their outer ends being connected by a rod 29'. As shown, the arms 28, 28', are so arranged that their free ends are located in a plane above the frame sections 1c to provide for the movements of the rods 29, 29'.

The spindles for the wheels 2 are provided with arms 30 connected by a rod 31 and one spindle has a separate arm 32 which is connected to a main rod 33 forming one element of the steering connections 13. The connections also include a bell crank 34 mounted on a bracket 35 secured to one sill section 1b, the rod 33 being connected to one arm of the bell crank 34. The other arm of the bell crank 34 is connected to the inner end of a rod 36. The opposite end of the rod 36 is connected to an extension 28a provided on that steering arm for the inner wheel 5' remote from the frame section 1b that carries the bell crank 34 and said extension in turn is connected by a rod 37 to a branch arm 37' provided on the arm 28' for the adjacent outer wheel 5.

In the arrangement above described, all of the wheels 2, 5, 5', are simultaneously steered, the connections being so arranged that all of the wheels, when swung about their knuckle axes, steer the truck about a center common to all of the wheels.

From the foregoing description it will be noted that the steering connections for the pairs of load wheels are between them; accordingly danger of any thereof being jammed by engagement with an object when the truck is driven forwardly in effecting a load handling operation is eliminated. Also, the intermediate portion of the frame may be constructed in a ready and simplified manner to adequately support the maximum loads for which the truck is designed, thereby insuring minimum production cost.

To those skilled in the art to which my invention relates, many changes in construction and widely differing embodiments and applications of the invention will suggest themselves without departing from the spirit thereof. My disclosures and the description herein are purely illustrative and are intended to be in no sense limiting.

What I claim is:

1. In an industrial truck, the combination of a frame having a low load supporting portion at one end, power driven wheels for supporting the other end of said frame, a sub-frame trunnioned on said low frame portion, inner and outer opposed pairs of knuckle mounted steerable wheels carried by the inner and outer ends respectively of said sub-frame and arranged to support the load carrying portion of said frame, and steering connections between said steerable wheels arranged to steer all thereof simultaneously about a common center, said connections including an arm connected to the spindle of each wheel and extending toward the opposite pair of wheels, separate members free from attachment to said sub-frame for connecting the arms of each pair of wheels together, said members being disposed above and substantially transversely of said low frame portion and between said pairs of steerable wheels, and another member free from attachment to said sub-frame connecting one arm of one pair of wheels to one arm of the opposite pair of wheels.

2. In an industrial truck, the combination of a frame having a low load supporting portion at one end, power driven wheels for supporting the other end of said frame, a sub-frame trunnioned on said low frame portion, inner and outer opposed pairs of knuckle mounted steerable wheels carried by the inner and outer ends respectively of said sub-frame and arranged to support the load carrying portion of said frame, and steering connections between said steerable wheels arranged to steer all thereof simultaneously about a common center, said connections including an arm connected to the spindle of each wheel and extending toward the opposite pair of wheels, separate members free from attachment to said sub-frame for connecting the arms of each pair of wheels together, said members being disposed substantially transversely of said low frame portion and between said pairs of steering wheels, and another member free from attachment to said sub-frame connecting one arm of one pair of wheels to one arm of the opposite pair of wheels, and the free ends of said arms and the respective connecting members therefor being in a plane above said low frame portion.

3. In an industrial truck, the combination of a frame having at one end a low load supporting portion, the outer section of said portion being disposed in a plane below the inner section thereof, a platform surmounting said low frame portion and arranged to rest on said inner section, power driven wheels for supporting the opposite end of said frame, a sub-frame trunnioned on the outer section of said low frame portion, inner and outer opposed pairs of knuckle mounted steerable wheels carried by the inner and outer ends respectively of said sub-frame and arranged to support the load carrying portion of said frame, and steering connections between said steerable wheels arranged to steer all thereof simultaneously about a common center, said connections including an arm connected to the spindle of each wheel and extending toward the opposite pair of wheels, separate members free from attachment to said sub-frame for connecting the arms of each pair of wheels together, said members being disposed substantially transversely of said low frame portion and between said pairs of steerable wheels, and another member free from attachment to said sub-frame connecting one arm of one pair of wheels to one arm of the opposite pair of wheels, the free ends of said arms and the respective connecting members therefor being operable in the space between said platform and the outer section of said low frame portion.

4. In an industrial truck, the combination of a frame having a low load supporting portion at one end, power driven steerable wheels for supporting the other end of said frame, a sub-frame trunnioned on said low frame portion, inner and outer opposed pairs of knuckle mounted steerable wheels carried by the inner and outer ends respectively of said sub-frame and arranged to support the load carrying portion of said frame, and steering connections between said driven steerable wheels and said last mentioned steerable wheels arranged to steer all thereof simultaneously about a common center, said connections for the last mentioned steerable wheels including an arm connected to the spindle of each wheel and extending toward the opposite pair of wheels and separate members free from attachment to said sub-frame for connecting the arms of each pair of wheels together, said members being disposed above and substantially transversely of said low frame portion and between said pairs of steerable wheels, and another member free from attachment to said sub-frame connecting one arm of one pair of wheels to one arm of the opposite pair of wheels.

5. In an industrial truck, the combination of a frame including a pair of longitudinal sills having at one end inwardly off-set sections forming a low load supporting portion, power driven wheels for supporting the other end of said frame, a pair of sub-frame members trunnioned on said low frame portion at opposite sides thereof, inner and outer opposed pairs of knuckle mounted steerable wheels carried by the inner and outer ends respectively of said sub-frame and arranged to support the load carrying portion of said frame, and steering connections between said steerable wheels arranged to steer all thereof simultaneously about a common center, said connections including an arm connected to the spindle of each wheel and extending toward the opposite pair of wheels, separate members free from attachment to said sub-frame for connecting the arms of each pair of wheels together, said members being disposed above and substantially transversely of said low frame portion and between said pairs of steerable wheels, and another member free from attachment to said sub-frame connecting one arm of one pair of wheels to one arm of the opposite pair of wheels.

6. In an industrial truck, the combination of a frame including a pair of longitudinal sills having at one end inwardly off-set sections forming a low load supporting portion, power driven wheels for supporting the other end of said frame, a pair of sub-frame members trunnioned on said low frame portion at opposite sides thereof, inner and outer opposed pairs of knuckle mounted steerable wheels carried by the inner and outer ends respectively of said sub-frame and arranged to support the load carrying portion of said frame, and steering connections between said steerable wheels arranged to steer all thereof simultaneously about a common center, said connections including an arm connected to the spindle of each wheel and extending toward the opposite pair of wheels, separate members free from attachment to said sub-frame for connecting the arms of each pair of wheels together, said members being disposed substantially transversely of said low frame portion and between said pairs of steerable wheels, and another member free from attachment to said sub-frame connecting one arm of one pair of wheels to one arm of the opposite pair of wheels, and the free ends of said arms and the respective connecting members therefor being in a plane above said low frame portion.

EDWARD H. REMDE.